US011254587B1

(12) United States Patent
King et al.

(10) Patent No.: US 11,254,587 B1
(45) Date of Patent: Feb. 22, 2022

(54) INTERNAL CONNECTOR FOR MODULAR FLUID TREATMENT SYSTEM

(71) Applicant: Eljen Corporation, Windsor, CT (US)

(72) Inventors: James M. King, Ellington, CT (US); James M. Donlin, South Windsor, CT (US)

(73) Assignee: Eljen Corporation, East Hartford, CT (US)

( * ) Notice: Subject to any disclaimer, the term of this patent is extended or adjusted under 35 U.S.C. 154(b) by 157 days.

(21) Appl. No.: 16/732,392

(22) Filed: Jan. 2, 2020

Related U.S. Application Data

(60) Provisional application No. 62/787,408, filed on Jan. 2, 2019.

(51) Int. Cl.

| | |
|---|---|
| ***C02F 1/00*** | (2006.01) |
| ***E02B 11/00*** | (2006.01) |
| ***F16L 5/00*** | (2006.01) |
| ***E03F 1/00*** | (2006.01) |
| *C02F 103/00* | (2006.01) |

(52) U.S. Cl.
CPC ............ *C02F 1/004* (2013.01); *E02B 11/005* (2013.01); *E03F 1/002* (2013.01); *F16L 5/00* (2013.01); *C02F 2103/001* (2013.01); *C02F 2201/004* (2013.01)

(58) Field of Classification Search
CPC ................ C02F 1/004; C02F 2103/001; C02F 2201/004; E03F 1/002; F16L 5/00; F16L 3/04; F16L 3/02; E02B 11/005
See application file for complete search history.

(56) References Cited

U.S. PATENT DOCUMENTS

| | | | | |
|---|---|---|---|---|
| 2,052,020 A | | 8/1935 | Black | |
| 4,824,287 A | | 4/1989 | Tracy | |
| 4,898,494 A | * | 2/1990 | Ellis | E02B 11/00 285/148.22 |
| 5,597,264 A | | 1/1997 | Laak | |
| 5,951,203 A | | 9/1999 | Laak | |

(Continued)

FOREIGN PATENT DOCUMENTS

| | | | | |
|---|---|---|---|---|
| SU | 1772313 A1 | | 10/1992 | |
| WO | WO-2018168398 A1 | * | 9/2018 | F16L 5/00 |

OTHER PUBLICATIONS

"Eljen® In-Drain, A Cost-Effective Replacement For Septic Leach Field Materials," Eljen Corporation, prior to Jan. 2, 2019.

(Continued)

*Primary Examiner* — Liam Royce
(74) *Attorney, Agent, or Firm* — Alix, Yale & Ristas, LLP

(57) ABSTRACT

A connector for axially fixing a module or support of a module to an elongate pipe has a central web with a rear flange extending from a rear edge and a front web extending from a front edge. The web may be partially cylindrical with the flanges extending radially. The web is sized and shaped to mate with the outer surface of the cylindrical pipe and extend through a hole in the module support with the rear web against the rear face of the support and the front web against the front face of the support. A fabric layer is wrapped around the outside to conceal the support and connector. A fluid treatment unit with spaced apart modules utilizes the connector to fix the modules axially to the pipe with a fabric layer concealing the support and connector.

8 Claims, 13 Drawing Sheets

(56) References Cited

U.S. PATENT DOCUMENTS

| | | | | |
|---|---|---|---|---|
| 7,374,670 | B2 | 5/2008 | Potts | |
| 8,104,994 | B1 * | 1/2012 | Donlin | E02B 11/005 405/45 |
| 2010/0101045 | A1 * | 4/2010 | Van Walraven | F16L 5/00 16/2.1 |
| 2020/0062197 | A1 * | 2/2020 | Nakaizumi | F16L 5/00 |

OTHER PUBLICATIONS

"In-Drains," Ruck Systems, Inc., Storrs, Connecticut, 1992.
Laak, R., "Ruck A Fins—R1032C. Manual Design and Installation," RUCK Systems, 2009.
Laak, R., "Ruck L, Fins," RUCK Systems, Inc., Mar. 31, 1997.
Laak, R., "Using In-Drain Geosynthetics in Soil Infiltration Systems," Univ. of Connecticut, 1989 International Summer Meeting of the American Society of Agricultural Engineers and the Canadian Society of Agricultural Engineering, Jun. 25-28, 1989.
Laak, R., "Using In-Drains at Soil Clogging Infiltration Surface," Univ. of Connecticut, 1988 International Summer Meeting of the American Society of Agricultural Engineers, Jun. 26-29, 1988.
Mantis® product, early version with spacer comb photo, Eljen Corporation, prior to Jan. 2, 2019.
"Mantis® Wastewater Systems 536-8 Series, System Design & Installation Manual," Eljen Corporation, Connecticut, Feb. 2015.

* cited by examiner

INTERNAL CONNECTOR FOR MODULAR FLUID TREATMENT SYSTEM

CROSS-REFERENCE TO RELATED APPLICATION

This application claims priority to U.S. Provisional Application No. 62/787,408 for "Internal Connector for Modular Fluid Treatment System," filed Jan. 2, 2019, the entire contents of which are incorporated herein by reference.

BACKGROUND

The present disclosure relates generally to the field of subsoil fluid drainage, absorption and treatment systems, and more particularly to embodiments of a connector for securing a module to a support pipe. An inventive connector is internal to a module within a system of multiple modules.

Conventional subsoil fluid absorption systems are comprised of trenches or excavations filled with small rock aggregate and overlaid with a perforated pipe. The pipe may be overlaid with a geotextile fabric and/or more rock aggregate. Soil is placed over the aggregate and perforated pipe to fill the trench to the adjoining ground level. In use, fluid flows through the pipe and out the perforations. Fluid is held within cavities in the aggregate until it can be absorbed into the soil. Other conventional systems use hollow plastic chambers placed beneath ground level to hold fluid until the fluid can flow through slits or apertures in the chamber and can be absorbed into the soil.

In a particularly effective wastewater treatment system manufactured and sold by Eljen Corporation under the name Mantis®, individual modules are spaced apart from one another along a support pipe that passes through the center of each module. Each of the modules includes a support structure with a treatment fabric wrapped around the support structure. In the Mantis® wastewater system, the support pipe doubles as a wastewater delivery conduit with holes that are aligned with the modules to deliver wastewater to the interior of the modules. An ongoing consideration is maintaining the individual modules in their respective position along the pipe without shifting or sliding. Units have been developed that mechanically connect modules to the pipe and/or to adjacent modules that are positioned on the exterior of the modules, typically in contact with a portion of the overlaid fabric.

A set of multiple spaced apart modules along a fluid distribution pipe is placed within an excavated section of property, typically in a substantially flat alignment, and then the excavation is backfilled with soil or sand. In such treatment systems, a key consideration is the surface contact between the outer fabric of the modules and the surrounding soil. Over time, organic deposits develop on the surface of the fabric (the interface between the fabric and surrounding soil), commonly referred to as a biomat layer. The biomat layer is a significant contributor for naturally treating bio-related fluid, such as septic fluid or drainage, in the soil. Thus, it is highly advantageous to maximize the fabric-soil interface contact area and minimize encroachment and disruption of the surrounding soil environment.

As such, it would be useful to have a connector for mechanically holding each module in place along the length of the pipe that does not impede or otherwise enter into the external environment outside the module and is maintained beneath the fabric.

Concepts relevant to the Mantis® wastewater system and other related spaced modular fluid treatment systems are disclosed and claimed in Eljen Corporation's U.S. Pat. Nos. 8,104,994, 8,777,515, 9,809,941, which are incorporated herein by reference for background of the types of systems and modules within which the inventive connectors are configured to be used.

SUMMARY

In one embodiment, a connecting element for axially fixing a support for a drainage module to an axially extending pipe has a partially cylindrical central web extending longitudinally between a rear edge and a front edge. A rear flange extends radially out from the rear edge and a front flange extending radially out from the front edge. The partially cylindrical web is sized and shaped to mate with an outer surface of a cylindrical pipe. An axial spacing between the rear flange and front flange is sized to receive a support module with opposing faces such that the rear flange abuts the one module face and the front flange abuts the other module face to maintain the module in an axial position along the pipe when the connecting element is fixed to the pipe.

In another embodiment, a fluid treatment unit comprises an elongated pipe, a plurality of drainage modules and a plurality of connecting elements. extending in an axial direction and having a cylindrical outer wall. The modules are spaced from one another axially along the pipe and each comprises an internal support with opposite front and rear faces with each face having a hole through which the pipe extends. Each connecting element has a partially tubular central web extending longitudinally between a rear edge and a front edge, a rear flange extending radially out from the rear edge and a front flange extending radially out from the front edge. A connecting element is fixed to the pipe with the partially tubular web mounted on the cylindrical outer wall extending through the hole in the front face and hole in the rear face of a support, the rear flange abutting the rear face of the support and the front flange abutting the front face of the support, thereby maintaining the module in an axial position along the pipe.

In yet another embodiment, a fluid treatment unit has an elongated pipe, plurality of drainage modules, plurality of connecting elements and a sheet of fluid permeable fabric. The elongated pipe extends in an axial direction and has a flow channel defined by a substantially cylindrical outer wall. The modules are spaced from one another axially along the pipe with the pipe extending through each module, each drainage module comprising an internal support with opposite front and rear faces. Each of the connecting elements is associated with a module and has a central web extending through the module between the pipe wall and support, and a flange extending radially out from at least the front edge abutting a front face of the support to maintain the module in an axial position along the pipe. A sheet of fluid permeable fabric is wrapped around the support and connecting element of at least one module concealing the connector flange.

BRIEF DESCRIPTION OF THE DRAWINGS

Aspects of the preferred embodiments will be described in reference to the Drawings, where like numerals reflect like elements.

DETAILED DESCRIPTION

Among the benefits and improvements disclosed herein, other objects and advantages of the disclosed embodiments will become apparent from the following wherein like numerals represent like parts throughout the several figures. Detailed embodiments of an internal connector for a modular fluid treatment system are disclosed; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrase "in some embodiments" as used herein does not necessarily refer to the same embodiment(s), though it may. The phrases "in another embodiment" and "in some other embodiments" as used herein do not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on.

Further, the terms "substantial," "substantially," "similar," "similarly," "analogous," "analogously," "approximate," "approximately," and any combination thereof mean that differences between compared features or characteristics is less than 25% of the respective values/magnitudes in which the compared features or characteristics are measured and/or defined.

Figure 5:
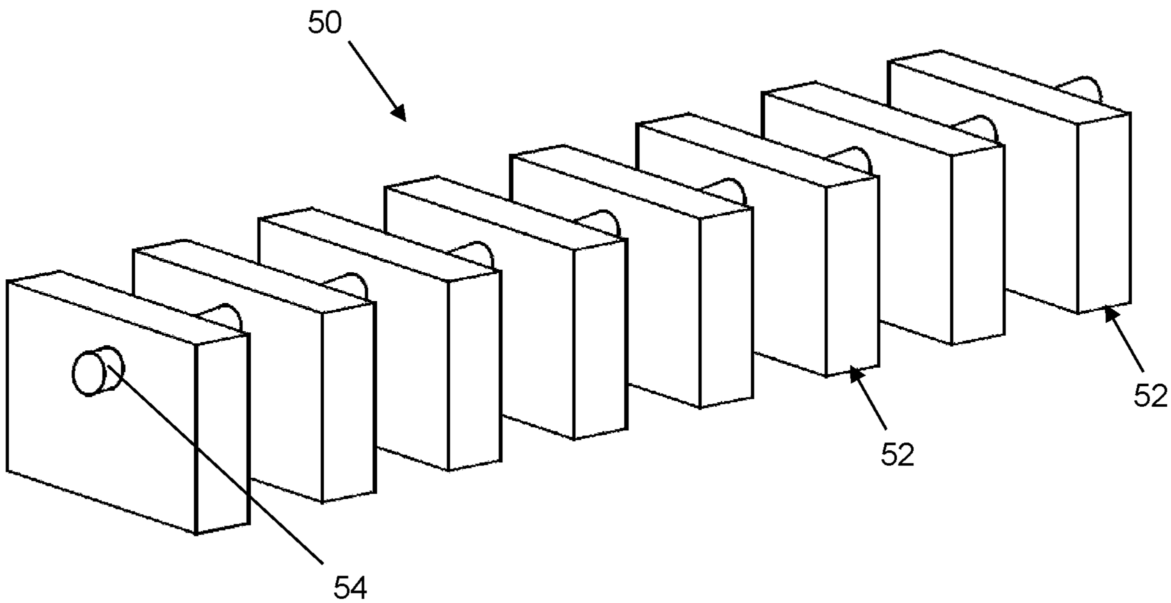
FIG. 5 shows an exemplary fluid treatment system within which the disclosed connector is typically used.
Figure 6:
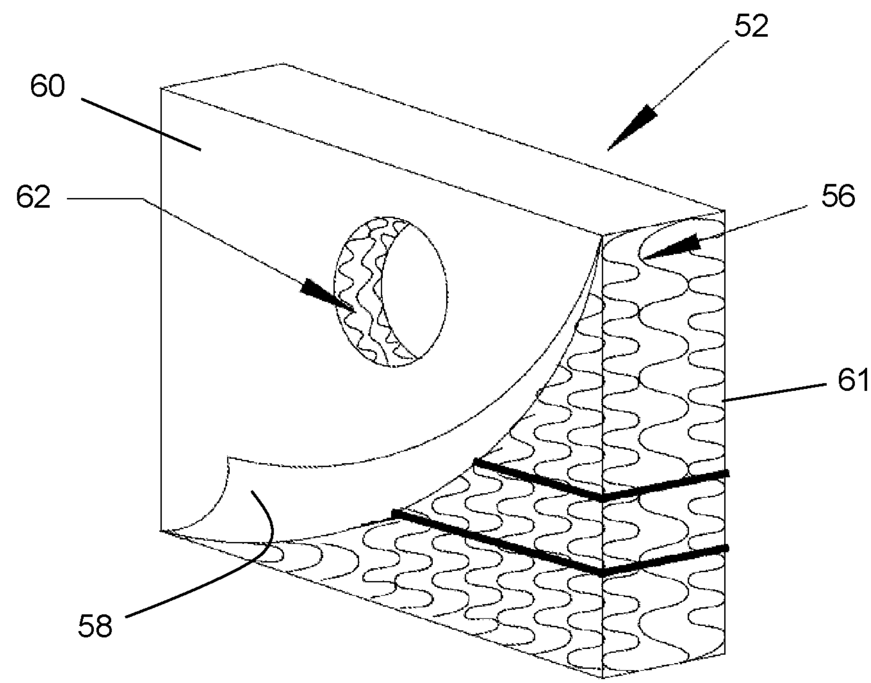
FIG. 6 shows an exemplary module for use within the drainage system of FIG. 5 with pipe removed.

As background to the inventive connectors disclosed herein, the connectors are configured to be used in cooperation with elements in a modular treatment system 50 similar to that shown in FIG. 5. The exemplary treatment system 50 includes a plurality of modules 52 each with a front and rear surface 60/61 spaced apart along a longitudinally extending pipe 54 that extends through a front and rear face of each module 52. Most generally, each module includes an inner support member 56 wrapped in at least one layer of a fluid permeable treatment fabric 58 with a longitudinal hole 62 extending from the front surface to the rear surface. The pipe 54 includes holes in its wall that are aligned with the modules 52 for delivery of wastewater to the interior of the modules between the front and rear faces. The fluid is maintained therein and gradually passes through the fabric into the external environment of sand, soil or other backfill that surrounds each module 52. The modules are all generally self-supporting and self-contained, and comprise generally non-absorbent materials as support with a surrounding layer of treatment fabric, that allows fluid flow into the surrounding environment (backfill) through the fabric layer. Within such wastewater systems, the non-absorbent support media is commonly referred to as "distribution media" while the fabric is referred to as "treatment media." The embodiments depicted herein show distribution media formed of several polymeric core sheets with cuspated configuration, however, this is non-limiting. Other embodiments exist, including distribution media formed from one or more of random inert packing, shredded polymeric material and porous walls with hollow interior.

A system 50 is placed within a subsoil excavation and then backfilled with soil, sand, aggregate or similar backfill that fills the space between adjacent modules, essentially enveloping each module. In such systems, the fabric/soil interfacial area, as it has been found that a layer with a high concentration of bacteria forms at this interface which is particularly effective at treating wastewater. Thus, it is desirable to maximize surface area of the fabric/soil interface in any way possible. It is also desirable to minimize disruption of the soil environment.

Figure 1:
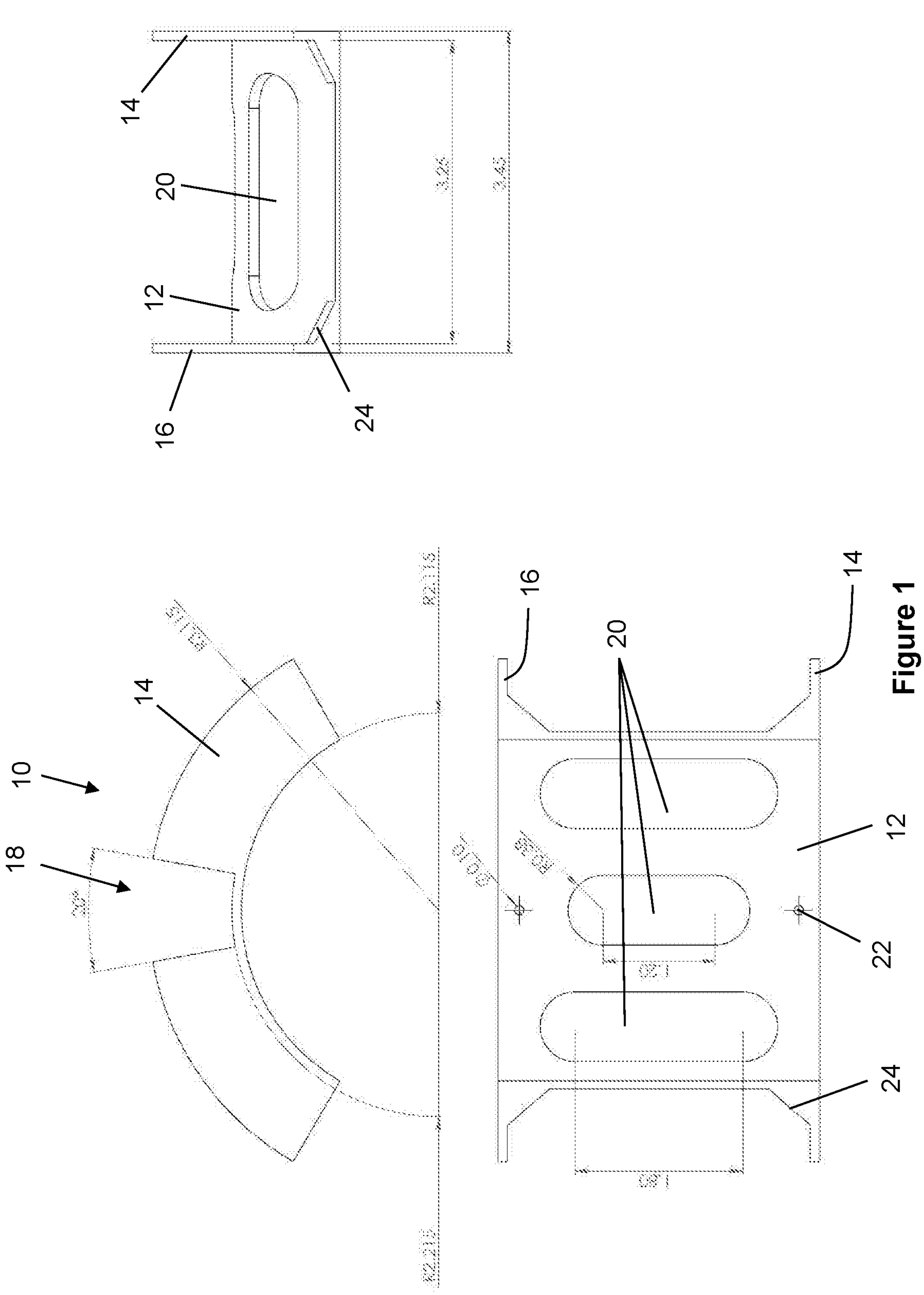
FIG. 1 shows several elevation views of one embodiment of the disclosed connector.

FIG. 1 shows a first embodiment of the internal connector 10. This connector 10 includes a central partial tubular web 12 extending longitudinally between opposite annular flanges, 14 and 16. The tubular form of the web 12 defines a partial circumferential wall sized and shaped to match somewhat closely to the outer wall of the support pipe 54 in a treatment system 50. The web 12 may also define one or more openings 20 and each flange 18 may include one or more notches 18. The web may include a pair of opposing pre-drilled screw holes 22 to aid in attaching the connector 10 to the pipe 54. Other embodiments omit the screw holes 22 and are configured for a user to drive a screw through the polymeric material. This embodiment has flanges 14 and 16 that are substantially uniform in radial thickness, however other embodiments exist with flanges that take on different shapes of varying thickness. The web 12 may transition to a flange 14 or 16 with a chamfered surface 24. Other embodiments exist with flanges extend substantially straight out from the web with straight edges.

Figure 2:
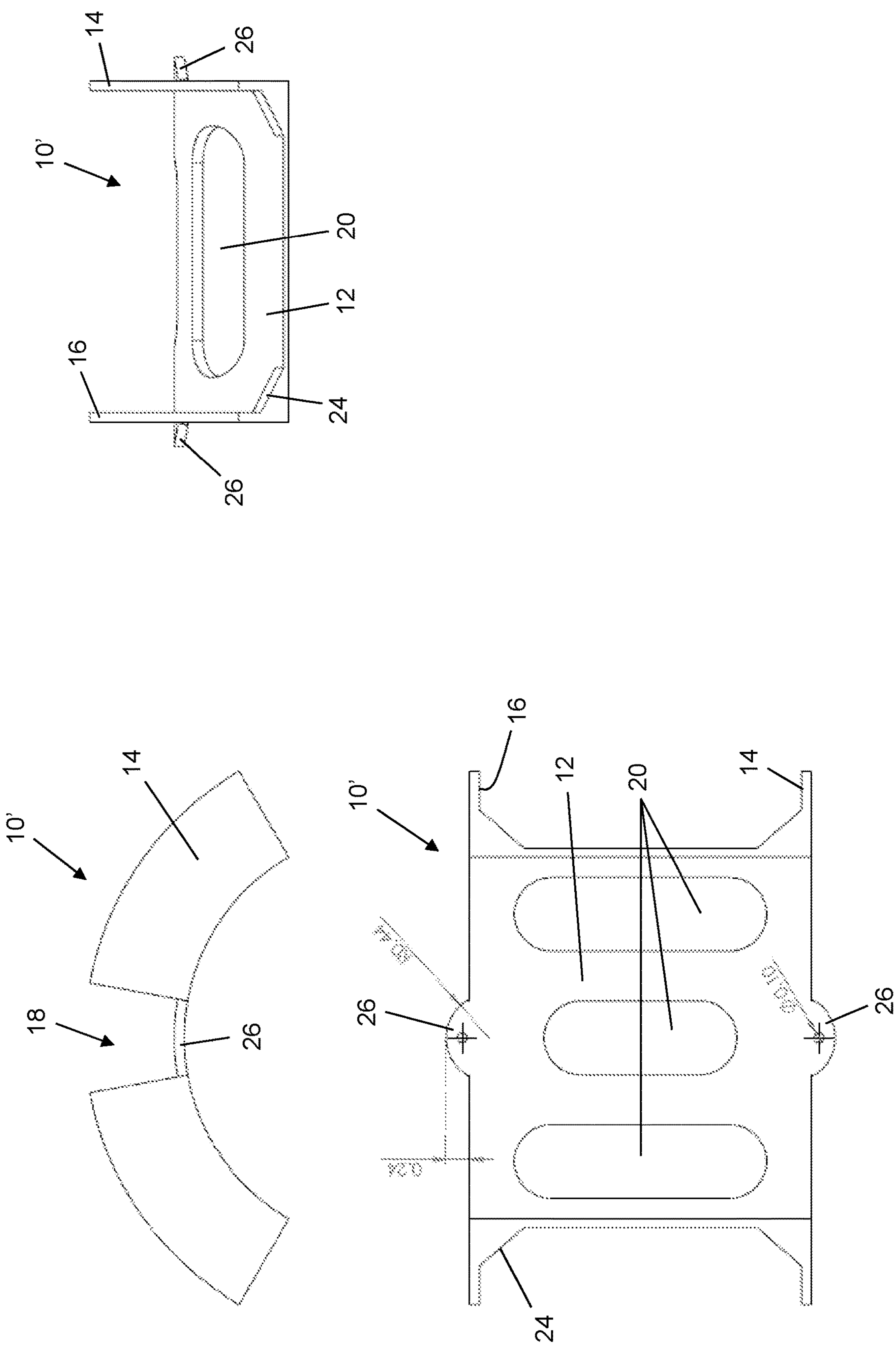
FIG. 2 shows several elevation views of another embodiment of the disclosed connector.

FIG. 2 shows another embodiment of the internal connector 10' that is identical in many respects to the connector 10 of FIG. 1. Like elements are shown with like reference numerals in FIG. 1 and FIG. 2. The primary difference in the connector 10' is the inclusion of a pair of opposing tabs 26 extending from the opposite longitudinal edges of the web 12. These tabs 26 may include pre-drilled holes for accommodating a screw for attachment, or the tabs may have a solid form for a screw to be drilled through.

Figure 3:
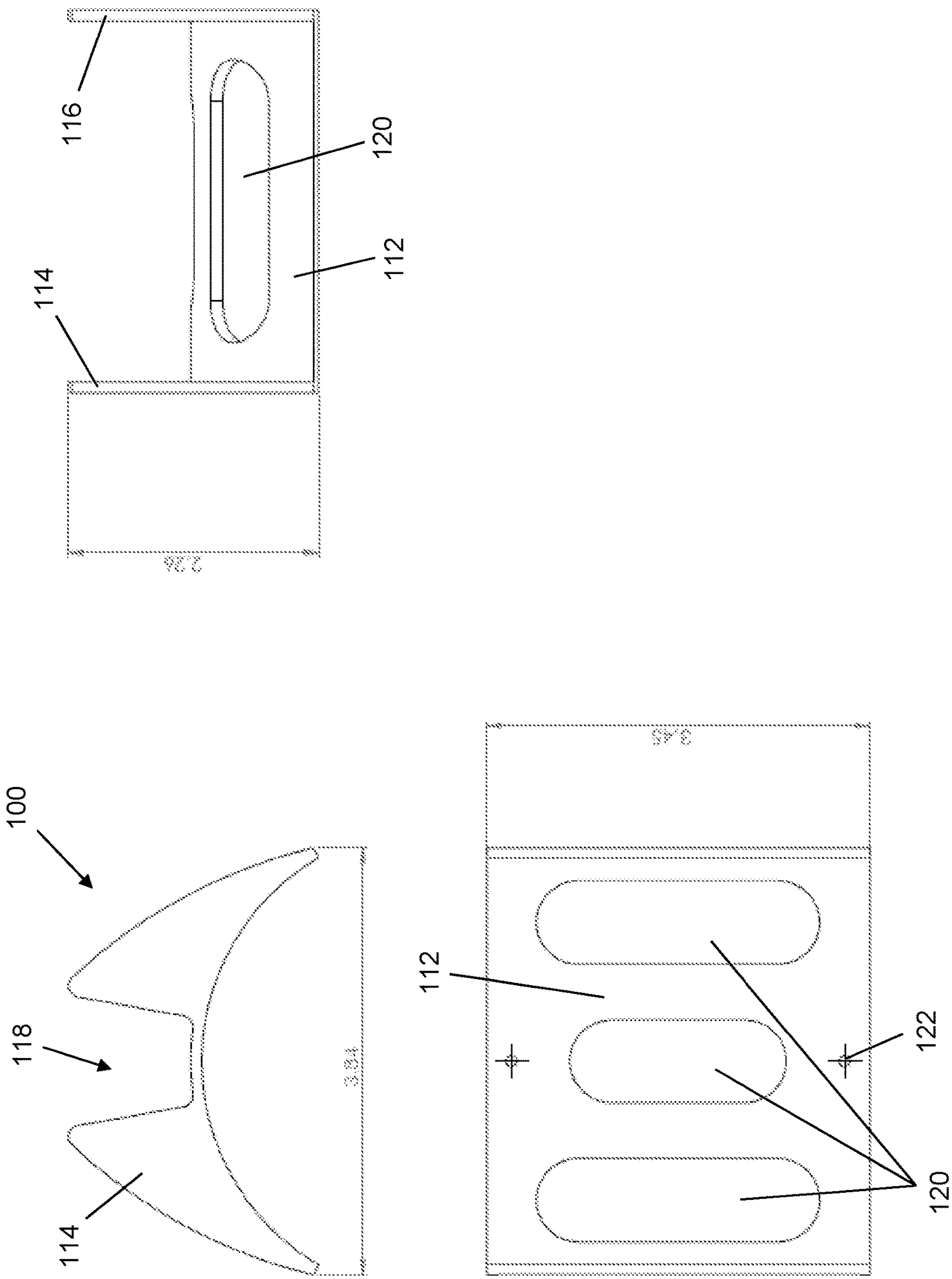
FIG. 3 shows several elevation views of another embodiment of the disclosed connector.

FIG. 3 shows another embodiment of the internal connector 100. In this embodiment, the annular flanges are replaced by fins 114 and 116 that extend from each radial edge of a tubular web 112. Each fin includes a notch 118 between opposite portions that are an approximate mirror image of one another. The web 112 is substantially similar in dimensions and configuration as the web 12 in earlier embodiments. It has a partial cylindrical shape defining a curves surface that is configured to mate against the outer surface of a pipe 54. The web 112 may also include one or more openings 120 like the earlier embodiment. The configuration of the fins 114/116 that extend upward from the tubular web 112 more acutely than the flanges 14/16 have shown to provide enhanced stability to the modules 50 when attached.

Figure 4:
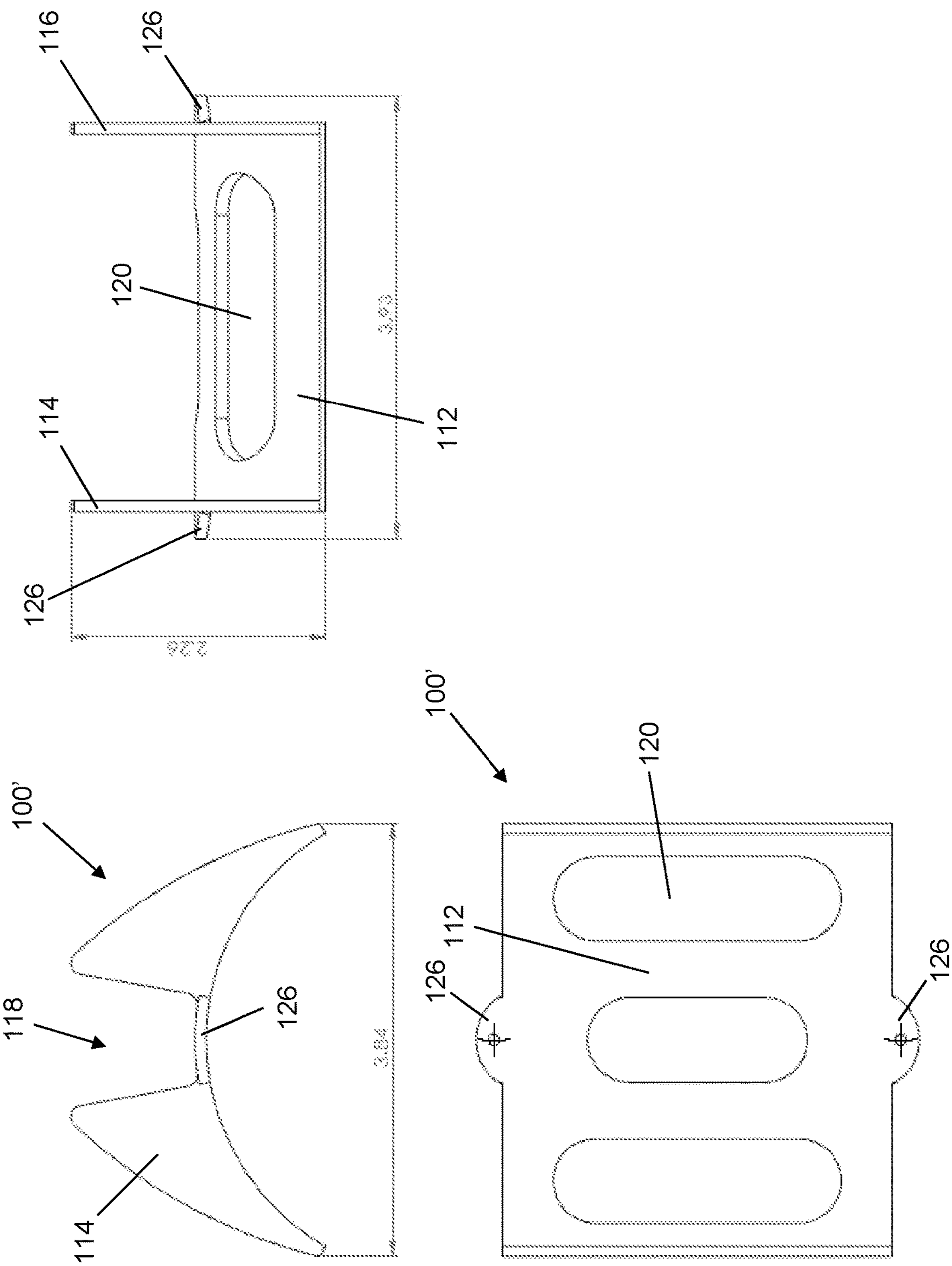
FIG. 4 shows several elevation views of another embodiment of the disclosed connector.

The embodiment of the connector 100' shown in FIG. 4 is substantially like the embodiment 100 with addition of longitudinally extending tabs 126 (similar to the tabs in the connector 10'). The remaining elements of the connector 100' are depicted with like numerals as in the connector 100.

The connectors 10, 10', 100 and 100' are configured to attach directly to a pipe 54 to hold a respective module 52 in place along the pipe without encroaching on the module's fabric/soil surface area whatsoever. That is, when installed, the connectors lie internal to each module with a fabric layer 58 outside the connector.

Installation of a connector and assembly of a treatment system 50 will be described with reference to the first connector embodiment 10, however it is substantially the same with each of the embodiments of FIGS. 1-4. An internal support member 56 with a longitudinally extending hole can be placed along a pipe 54 at a predetermined longitudinal position. A preferred embodiment of a support member includes a plurality of sheets of a core polymeric material. Other embodiments of a support include a hollow box 56' with perforations in the outer surfaces or other non-absorbent forms of materials (see FIG. 7).

The connector 10 is fit to the pipe 54 with the web 12 extending longitudinally within the support member 56 and one flange 14 on the outside of the front support member surface and the other flange 16 on the outside of the rear support member surface. In this manner, the opposite flanges 14 and 16 longitudinally "sandwich" the front and rear surfaces of the support member. The connector 10 can be secured to the pipe via screws or otherwise mechanically connected by techniques known in the art, such as adhesive, tabs received within a slot, lock and groove, for example. The support member 56 with connector 10 are thereafter wrapped with at least one layer of treatment fabric. Thus, the connector 10 does not lie to the outside of any portion of the fabric to encroach on the fabric/soil interface.

Preferably, the connector 10 is attached to the pipe angularly positioned with the flanges 14 and 16 extending upward. This is to add structural integrity to the upper portion of the modules, as the lower portion of the modules is naturally reinforced by abutting the excavation floor during installation. Additionally, the notches 18 allow increased air flow throughout the system.

Successive modules 52 can be assembled in a similar manner along the pipe 54 at preferred intervals and locked in place via another internal spacer 10.

FIGS. 11-17 depict yet another embodiment of the internal connector 200. This connector 200 includes a web 212 with opposite front and rear faces 214 and 216 extending downward from the longitudinal edges of the web 212. Each of the faces 214 and 216 defines a hole 218 sized and shaped to accommodate a pipe 54. In this embodiment of the connector 200, no screw or other separate fastening mechanism is utilized, as the connector 200 can maintain each support member 56 (and thus module 52, once wrapped in fabric 58) in its longitudinal position along the pipe 54 via friction.

As shown in the photographs of FIGS. 11-17, a connector 200 is positioned with its front face 214 on one longitudinal side of a module's support member 56 and the rear face 216 on the opposite longitudinal side of the support member with the pipe 54 within the holes 218 and the web 212 extending longitudinally across the top of the support member 56. Understandably, other configurations exist wherein the web can extend across a side surface or the bottom surface of the support member 56. Each support member 56 with connector 200 can be wrapped entirely with at least one layer of treatment fabric 58, thereby forming a module 52. Like the earlier embodiments, the connector 200 is positioned to the interior of the fabric layer 58, thereby not encroaching on any surface area of the fabric/soil interface.

Figure 14:
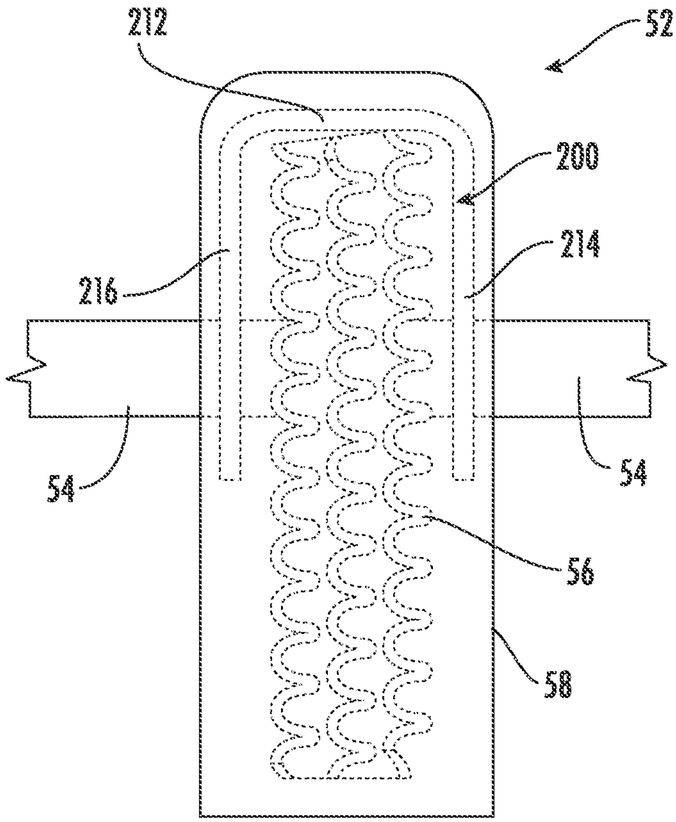
FIG. 14 is a partial section view from the side showing the elements of an assembled module using the connector of FIG. 11.

FIG. 14 shows a side cross sectional view of a module 52 connected to a pipe 54. As shown, the fabric layer 58 is wrapped around the connector 200 and support member 56. The web 212 of the connector 200 lies across the top surface and the front and rear faces 214 and 216 lie on opposite front and rear surfaces of the support member 56.

Figure 11:
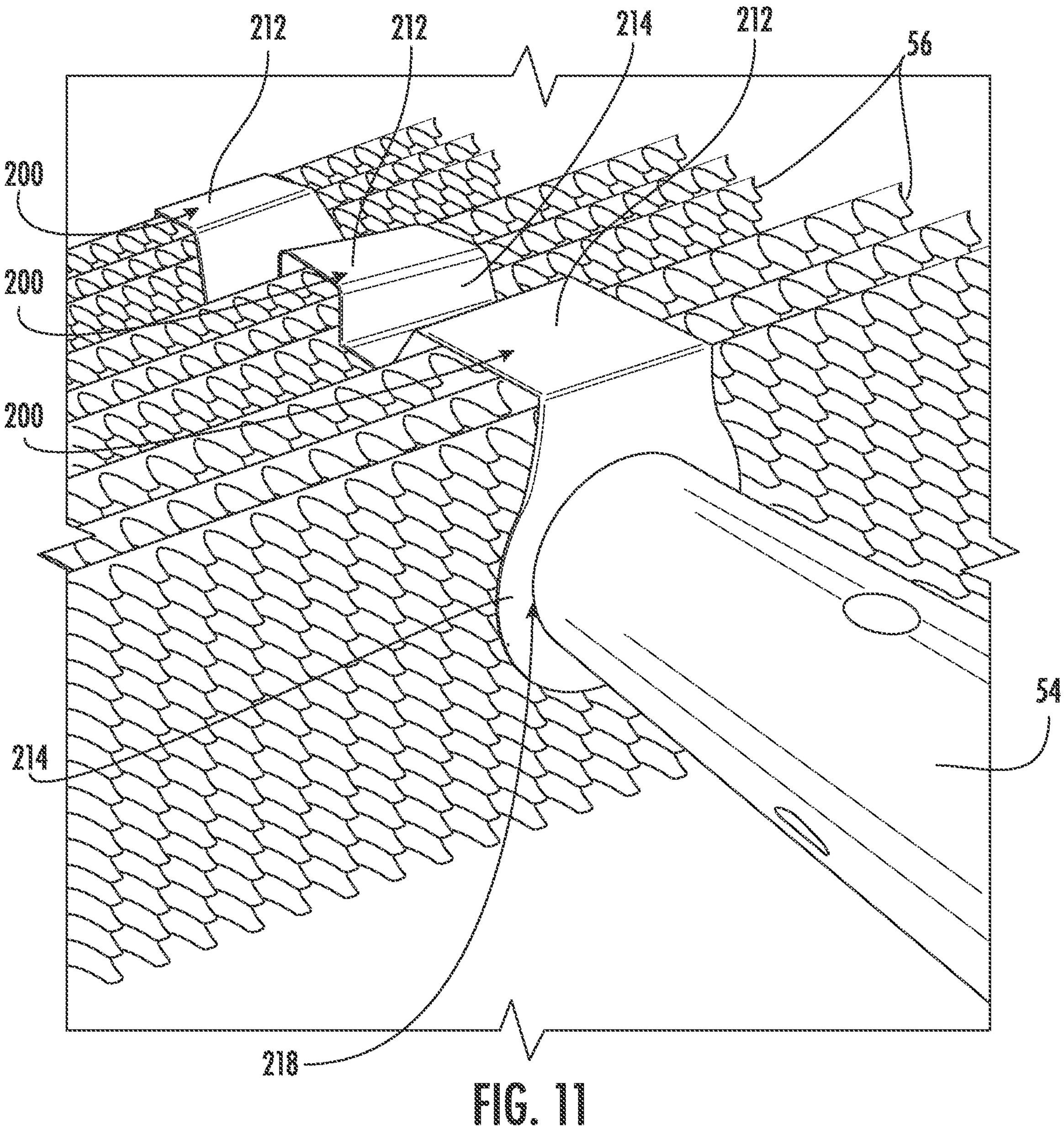
FIG. 11 is a perspective view of a semi-assembled drainage system showing another embodiment of the disclosed connector.
Figure 12:
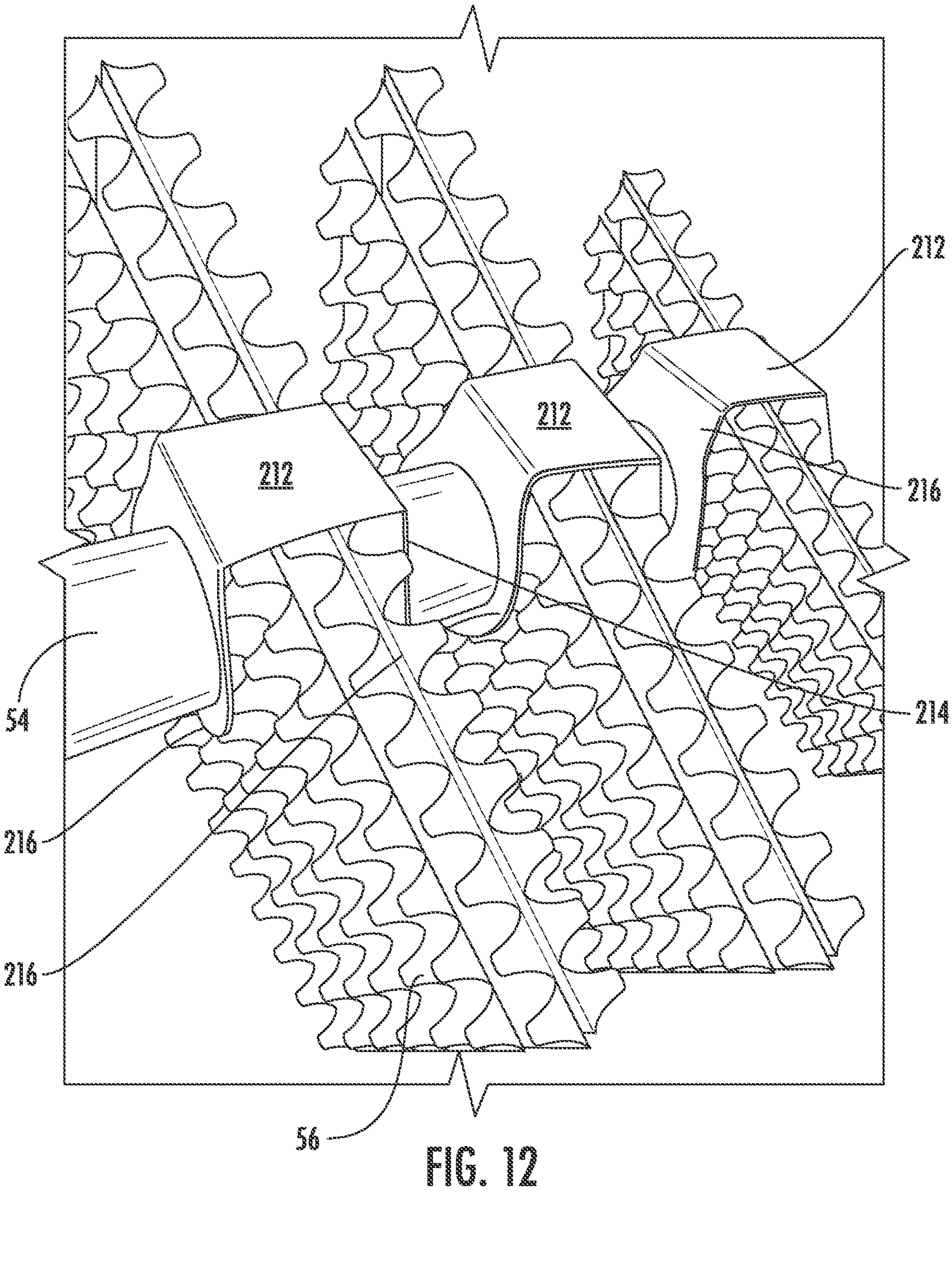
FIG. 12 is another perspective view of the semi-assembled drainage system of FIG. 11.
Figure 13:
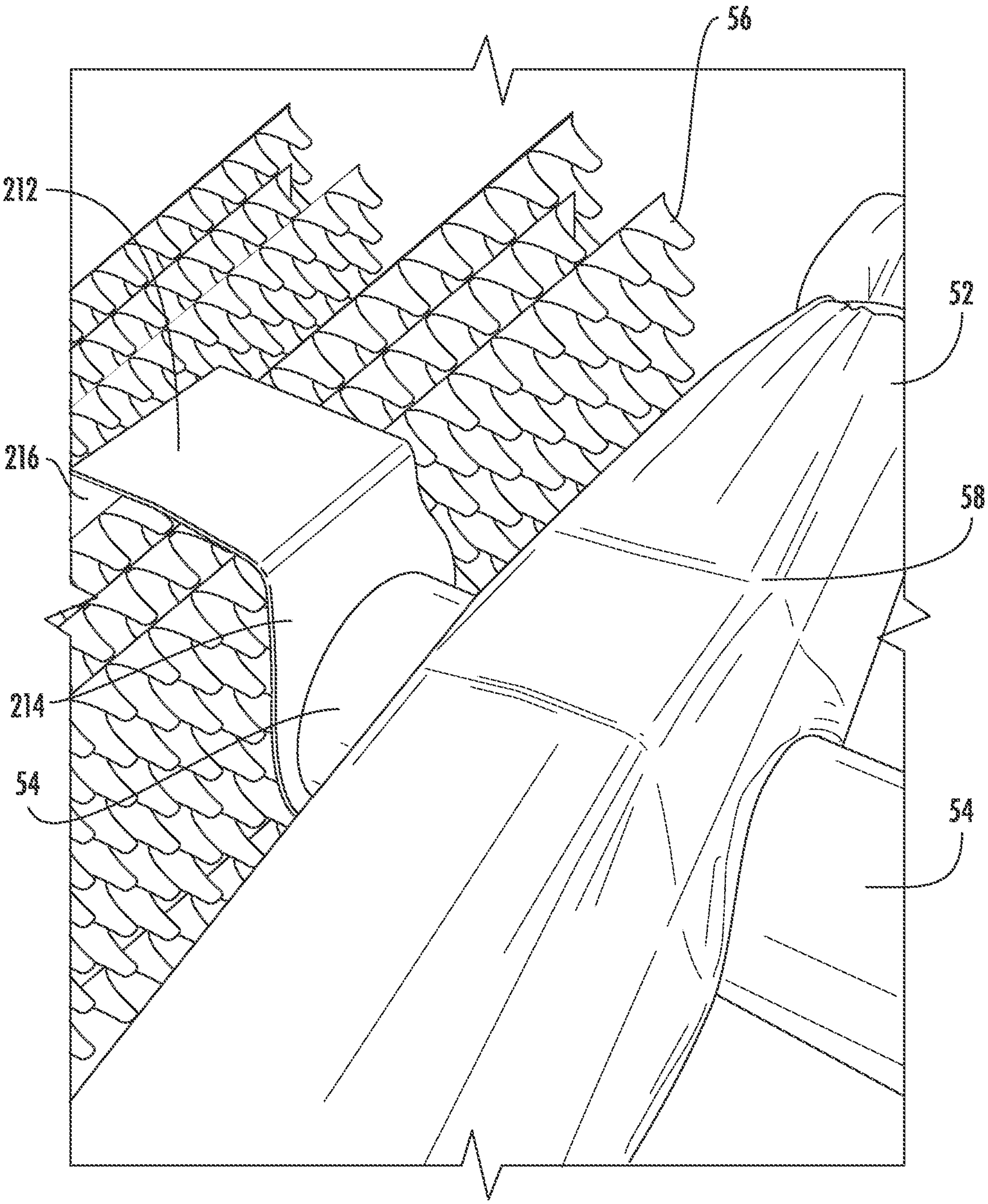
FIG. 13 is a perspective view of the semi-assembled drainage system of FIG. 11 showing fabric overlaid to form one module.
Figure 15:
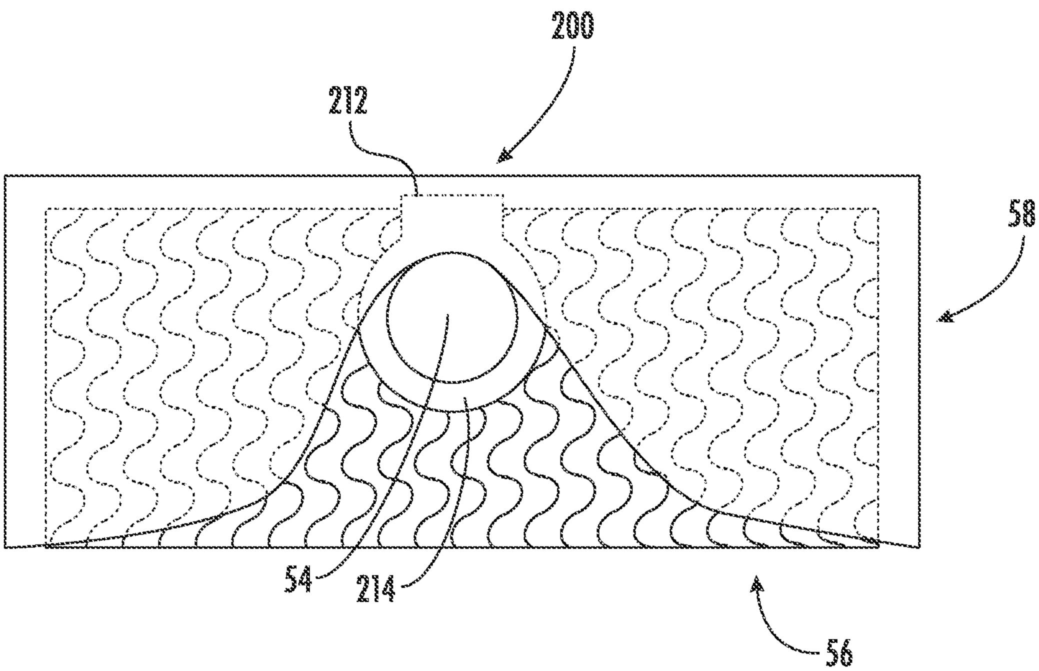
FIG. 15 is a partial section view from the front of the module of FIG. 14.
Figure 16:
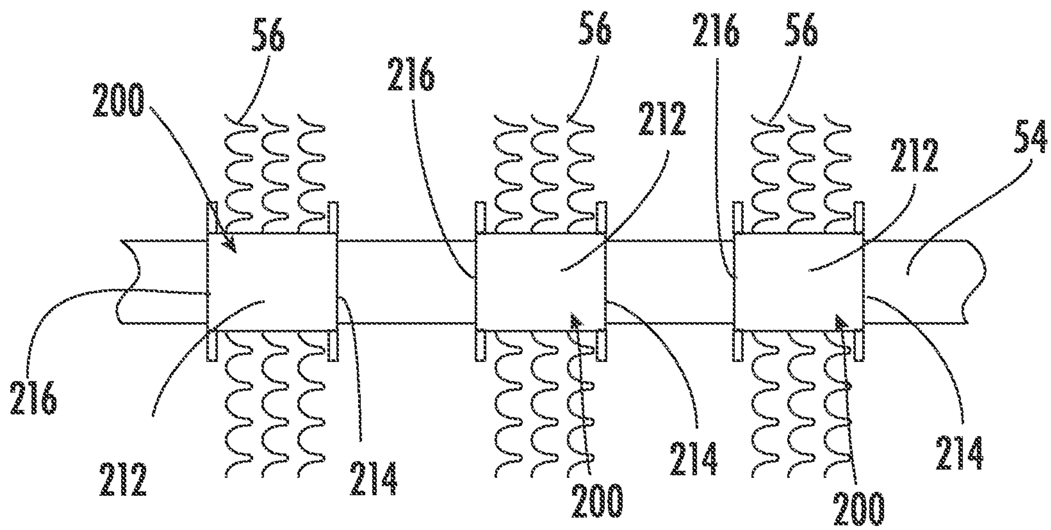
FIG. 16 is a top view of partially assembled drainage system using the connectors of FIG. 11.
Figure 17:
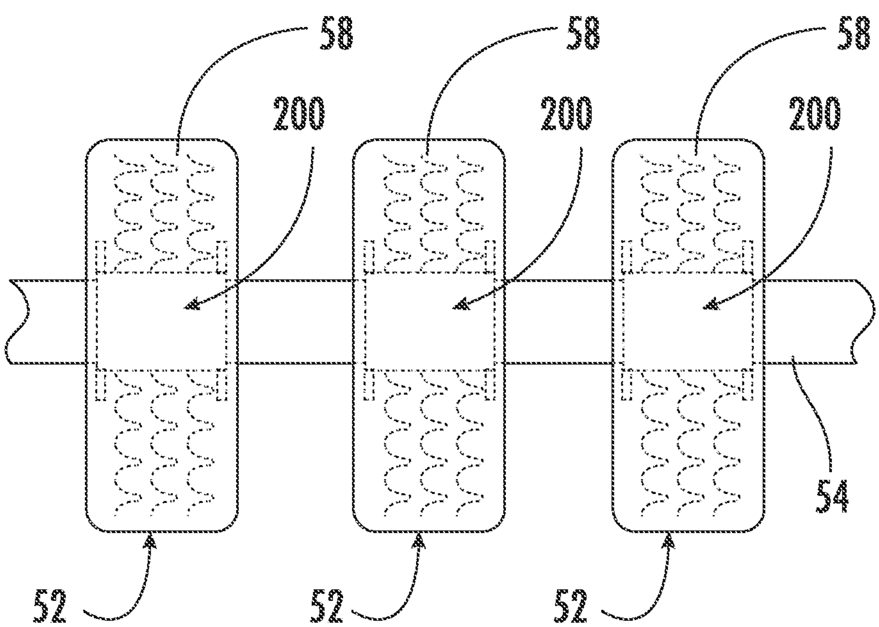
FIG. 17 is a top view in partial section of the assembled drainage system of FIG. 16.

FIG. 15 shows a longitudinal section view of the module of FIG. 11.

Figure 7:
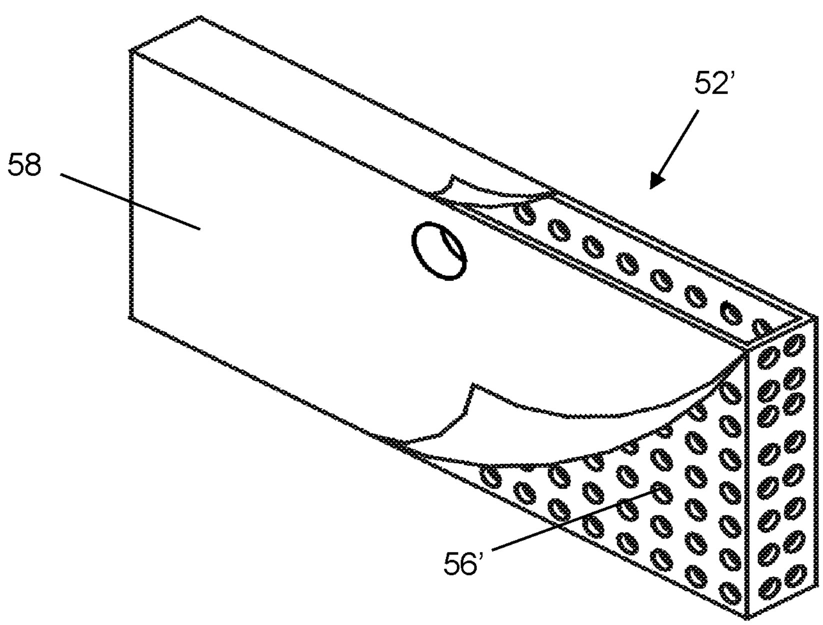
FIG. 7 shows a different exemplary module for use within the drainage system of FIG. 5.
Figure 8:
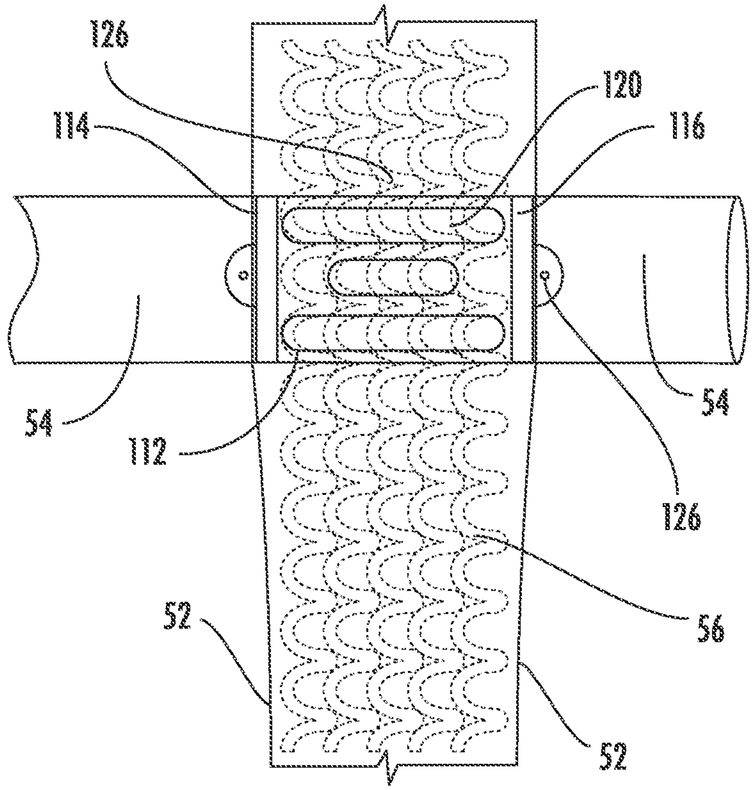
FIG. 8 is a partial section view from the top showing a module attached to a pipe using the connector of FIG. 4.
Figure 9:
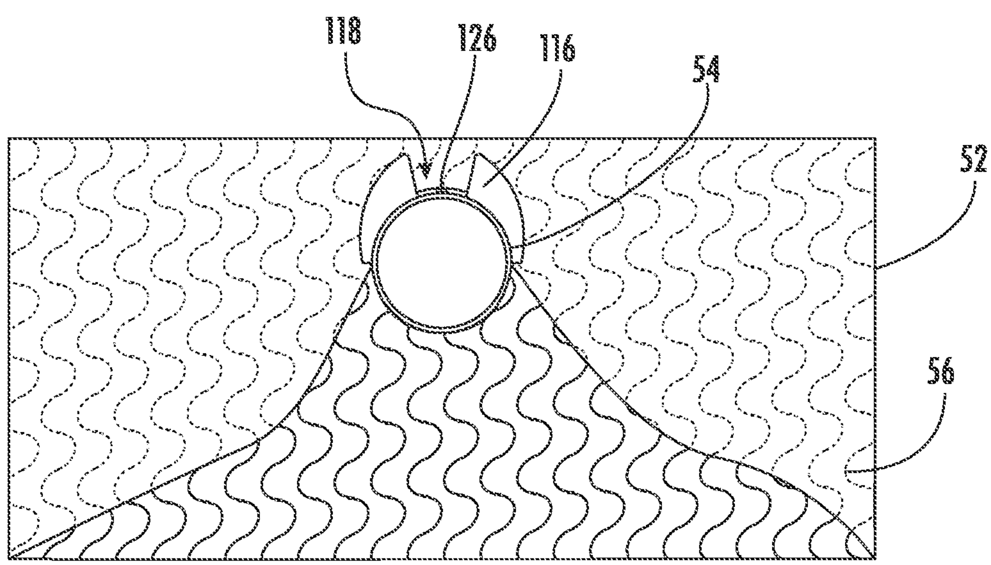
FIG. 9 is a partial section view from the front of the attached module of FIG. 8.
Figure 10:
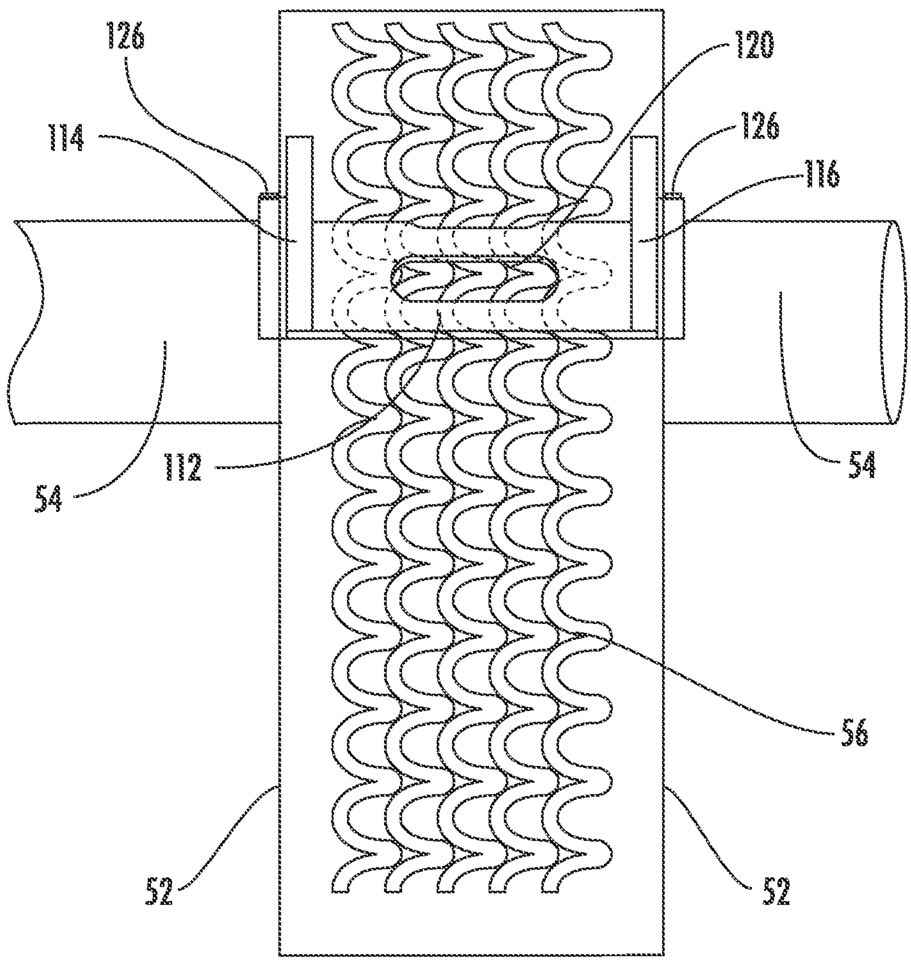
FIG. 10 is a partial section view from a side of the attached module of FIG. 8.

The most preferred inner support is a plurality of cuspated core sheets arranged in face to face orientation, as depicted in FIGS. 6 and 8-17. By way of non-limiting example, FIG. 7 illustrates an alternate embodiment of module 52' comprising an internal support 56' formed of a single layer of a polymeric sheet 56' in a box-like configuration. The polymer sheet 56' is fit with numerous drainage holes to improve fluid drainage from the interior cavity or chamber of the module 52' into the exterior environment when in use. As with the module 52 of FIG. 6, the module 52' is held in place along the pipe with an internal spacer and then wrapped in a fabric layer 58 such that the spacer and support 56' are internal to the module 52' without disruption of the soil environment or impacting the fabric/soil interface. Many other embodiments of an inner support exist and are contemplated for use within fluid treatment systems and connected to the pipe 54 with the disclosed spacer, such as for example, inert mesh material, random inert packing, hollow plastic balls, like Whiffle® balls, or other random pieces of polymer packing, alone or in combination.

A typical installation of a modular treatment system like that depicted generally in FIG. 5 that employs the disclosed internal connectors includes the sequential steps of:

1. Preparing an excavation, usually in a soil environment. The excavation should be sized and shaped to receive a modular unit. Of course, the size and configuration of the modular unit can also be varied as necessary to accommodate an excavation or environment.
2. Modular drainage units 50, including at least a plurality of modules 52 maintained to a support or fluid conduit pipe 54 via internal connectors (10, 10', 100, 100', 200) are placed within the excavation. Units can be assembled within the excavation or prior to placement therein. Adjacent support pipe pieces may be connected via appropriate connector and/or adhesive, depending on regulatory requirements if any. As indicated above, the plan layout of the modular system can be specified and configured as necessary for the particular environment with use of appropriate connectors.

3. An optional additional fluid permeable fabric overcover may be employed, typically laid over the modular unit to improve subsoil breathability of the system.
4. The excavation is backfilled by hand shoveling or sloughing clean backfill material along the sides, between fabric layers 58 of adjacent spaced modules 52 and the top of the modular treatment units 50. Backfill material can be clean and porous fill material, such as native soil, pearlite, septic fill, preferably devoid of large rocks. Appropriate seed may be laid over the excavated areas to protect against erosion and improve aesthetics.

As discussed above, all of the embodiments of the drainage unit have a fluid-permeable geotextile fabric wrapping around the front and rear faces, top and bottom faces, and/or side faces of the support module. The connectors are concealed by the fabric layer 58 such that they do not encroach into the surrounding soil environment and do not cover any of the fabric layer. The internal spacers thus help maximize the area of the fabric/soil interface—and resulting biomat layer—of each module to improve fluid treatment efficiency and quality. The bottoms may be wrapped or may be left uncovered to contact the excavation floor and facilitate fluid transfer to the soil. The fabric can be sewn into a formed cover and fitted over the support module. The cover, or separate fabric sections, can also be fastened to the support module by any other suitable method, for example by adhesive bonding, heat welding, stapling or banding. In these embodiments, the disclosed internal spacer is covered by the fabric layer (i.e., the flanges are sandwiched between the fabric and the underlying face of the support).

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and scope of the present invention.

What is claimed is:

1. A fluid treatment unit comprising:

an elongated pipe extending in an axial direction and having a cylindrical outer wall;

a plurality of drainage modules spaced from one another axially along the pipe, each drainage module comprising an internal support with opposite front and rear faces, each face having a hole through which the pipe extends; and a plurality of connecting elements, each having a partially tubular central web extending longitudinally between a rear edge and a front edge, a rear flange extending radially out from the rear edge and a front flange extending radially out from the front edge, wherein at least one of the plurality of connecting elements is fixed to the pipe with the partially tubular web mounted on the cylindrical outer wall extending through the hole in the front face and the hole in the rear face of the support of the one of the plurality of drainage modules, the rear flange abutting the rear face of the support and the front flange abutting the front face of the support, thereby maintaining the module in an axial position along the pipe.

2. The fluid treatment unit of claim 1, wherein each module comprises an outer fabric layer wrapper around the respective support and connecting element.

3. The fluid treatment unit of claim 2, wherein the connecting element includes one or more openings in the web.

4. The fluid treatment unit of claim 1, wherein the pipe comprises a plurality of holes in the wall for flow of fluid outward from an inner area defined by the wall.

5. The fluid treatment unit of claim 4, wherein a hole in the wall is aligned with a module such that fluid flows from the inner area of the pipe into the module and out through the fabric.

6. The fluid treatment unit of claim 2, wherein each flange is sandwiched between the outer fabric layer and the support.

7. The fluid treatment unit of claim 1, wherein the connecting element is fixed to the pipe via one or more fasteners driven through the pipe wall.

8. The fluid treatment unit of claim 7, wherein connecting element is the only axial restraint on the module.

* * * * *